T. BICKERTON.
Hand Corn-Planter.

No. 226,701.  Patented April 20, 1880.

WITNESSES:
Henry N. Miller
C. Sedgwick

INVENTOR:
T. Bickerton
BY Munn & Co
ATTORNEYS.

UNITED STATES PATENT OFFICE.

THOMAS BICKERTON, OF LAWRENCE, KANSAS.

HAND CORN-PLANTER.

SPECIFICATION forming part of Letters Patent No. 226,701, dated April 20, 1880.

Application filed February 5, 1880.

*To all whom it may concern:*

Be it known that I, THOMAS BICKERTON, of Lawrence, Douglas county, State of Kansas, have invented a new and useful Improvement in Hand Corn-Planters, of which the following is a specification.

Figure 1:
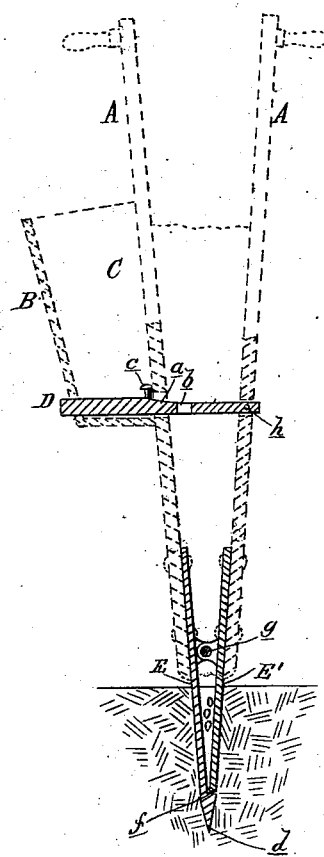
Figure 2:
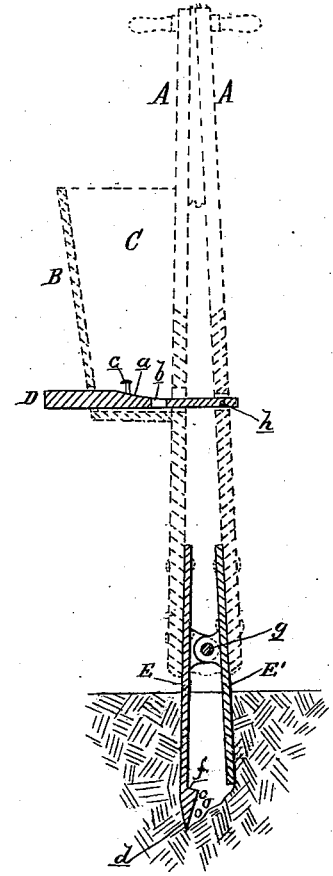
Figure 3:
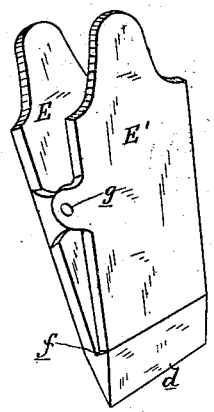
Figure 4:
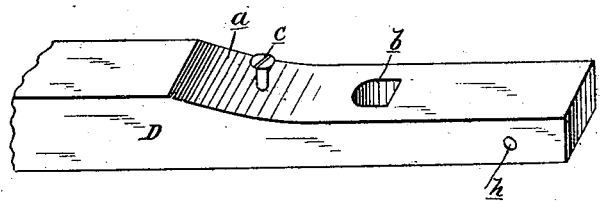

Figure 1 is a sectional side elevation of the improved device, showing the plates closed. Fig. 2 is a sectional side elevation of the same, showing the plates open. Fig. 3 is a perspective view of the improved plates, and Fig. 4 is a perspective view of the improved drop-slide.

Similar letters of reference indicate corresponding parts.

The object of this invention is to construct a hand corn-planter with a drop-slide which shall accurately drop the corn, and with end plates shaped so as to prevent dirt from getting between them when thrust into the ground.

The invention consists in a hand corn-planter having two plates, one longer than the other, and provided with a bevel-pointed flange, as hereinafter described.

In the drawings, A A represent the handles of the planter. (Shown in dotted lines.) B represents the hopper or receiver, and C the flexible sides of said hopper or receiver, both in dotted lines, the said flexible sides B being ordinarily constructed of some woven fabric, and made ordinarily to extend down as far as the hinge of the plates, as shown.

D is the drop-slide, cut away or inclined on its upper face, as shown at $a$, and provided with a central feed-opening, $b$, through which the corn drops.

E is the longer of the end plates, whose point is beveled both ways to a sharp edge, as shown at $d$, which bevel forms a flange or notch, $f$, above the edge $d$; and on the inner face of the said plate E, connected with the plate E by the hinge $g$, is the shorter plate E′, whose lower end closes in and upon the flange $f$, so that when the said plates E E′ are closed together and thrust into the ground they enter with a sharp point and smooth faces, like a wedge.

When the handles A A are in the position shown in Fig. 2 the feed-hole $b$ of the drop-slide D is within the hopper C, as shown, and is filled with corn enough for planting in one hill. Then when the handles A A are drawn apart, as shown in Fig. 1, the drop-slide D, whose smaller end is pinned to one of the handles A through the hole $h$, is drawn outward from the hopper C, so that the hole $b$ is then between the handles A A, the further opening of the handles A A being prevented by the stud $c$, which is set in the face of the drop-slide.

In the position shown in Fig. 1 the corn drops from the hole $b$ down between the closed plates E E′, and the plates are then thrust into the ground. Then the handles A A are again brought together, as shown in Fig. 2, the plates E E′ open, and the corn drops from between them. The plates are then closed by a suitable movement of handles A A and withdrawn from the ground, and the operation is repeated as may be desired; but it will be seen that the bevel-flange $f$, shutting over the end of the shorter plate E′, prevents dirt from getting between the plates E E′ when thrust into the ground, and consequently much time and trouble are saved that are necessary to keep the plates of ordinary planters unclogged and in good operating order.

Having thus described my invention, I claim as new and desire to secure by Letters Patent—

A hand corn-planter constructed with a plate, E, provided with a flange, $f$, formed above the beveled point $d$, in combination with the plate E′, substantially as herein shown, and for the purpose described.

THOMAS BICKERTON.

Witnesses:
CHAS. CHADWICK,
ED. CANARAN.